(12) United States Patent
Chen

(10) Patent No.: US 8,065,877 B2
(45) Date of Patent: Nov. 29, 2011

(54) SOLAR ENERGY CONVERTING DEVICE AND POWER SUPPLY SYSTEM INCLUDING THE SAME

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 435 days.

(21) Appl. No.: 12/405,542

(22) Filed: Mar. 17, 2009

(65) Prior Publication Data

US 2010/0141034 A1 Jun. 10, 2010

(30) Foreign Application Priority Data

Dec. 10, 2008 (CN) .......................... 2008 1 0306091

(51) Int. Cl.
*F03G 7/06* (2006.01)
*H02K 35/02* (2006.01)
*H02N 10/00* (2006.01)

(52) U.S. Cl. .......... 60/527; 60/641.8; 290/1 R; 310/306; 322/3

(58) Field of Classification Search .................. 290/1 R; 310/306; 60/641.8, 527; 322/3
See application file for complete search history.

(56) References Cited

U.S. PATENT DOCUMENTS

| | | | | |
|---|---|---|---|---|
| 3,339,077 A | * | 8/1967 | Shapiro | 290/1 R |
| 3,678,685 A | * | 7/1972 | Low et al. | 60/529 |
| 4,337,622 A | * | 7/1982 | Johnson | 60/641.13 |
| 4,342,920 A | * | 8/1982 | Bucknam | 290/1 R |
| 4,439,987 A | * | 4/1984 | Rideout, Jr. | 60/641.11 |
| 7,536,861 B2 | * | 5/2009 | Walpita | 60/641.11 |
| 7,847,421 B2 | * | 12/2010 | Gardner et al. | 290/1 R |

FOREIGN PATENT DOCUMENTS

| | | |
|---|---|---|
| JP | 63-309780 | * 12/1988 |
| JP | 2003-269322 | * 9/2003 |

\* cited by examiner

*Primary Examiner* — Burton Mullins
(74) *Attorney, Agent, or Firm* — Altis Law Group, Inc.

(57) ABSTRACT

A solar energy converting device includes a frame, a container, a thermal expansion member, a connecting rod, an inductor and magnetic members. The frame defines an opening. The container is positioned on an inner surface of the frame and positioned adjacent to the opening. The container defines a thermally sealed void space filled with an inert gas. The thermal expansion member is positioned on the container and partially surrounded by the container. The connecting rod has an end connected to the thermal expansion member. The magnetic members are positioned on the inner surface of the frame and configured for generating a magnetic field. The inductor coils around the connecting rod and is positioned among the magnetic members. The inductor is configured for being driven by the thermal expansion member to move back and forth in the magnetic field so as to generate a voltage.

17 Claims, 2 Drawing Sheets

SOLAR ENERGY CONVERTING DEVICE AND POWER SUPPLY SYSTEM INCLUDING THE SAME

BACKGROUND

1. Technical Field

The disclosure relates to solar energy utilizing technologies, and particularly, to a solar energy converting device and a power supply system including the same.

2. Description of Related Art

Due to the growing demand of clean energy, solar energy converting devices are widely used in recent years.

Solar cells are common types of solar energy converting devices, and include semiconductor units. However, semiconductor materials for typical semiconductor units are expensive. In addition, it is difficult to manufacture the typical semiconductor units using the semiconductor materials.

Therefore, a new solar energy converting device is desired to overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION OF THE EMBODIMENTS

Figure 1:
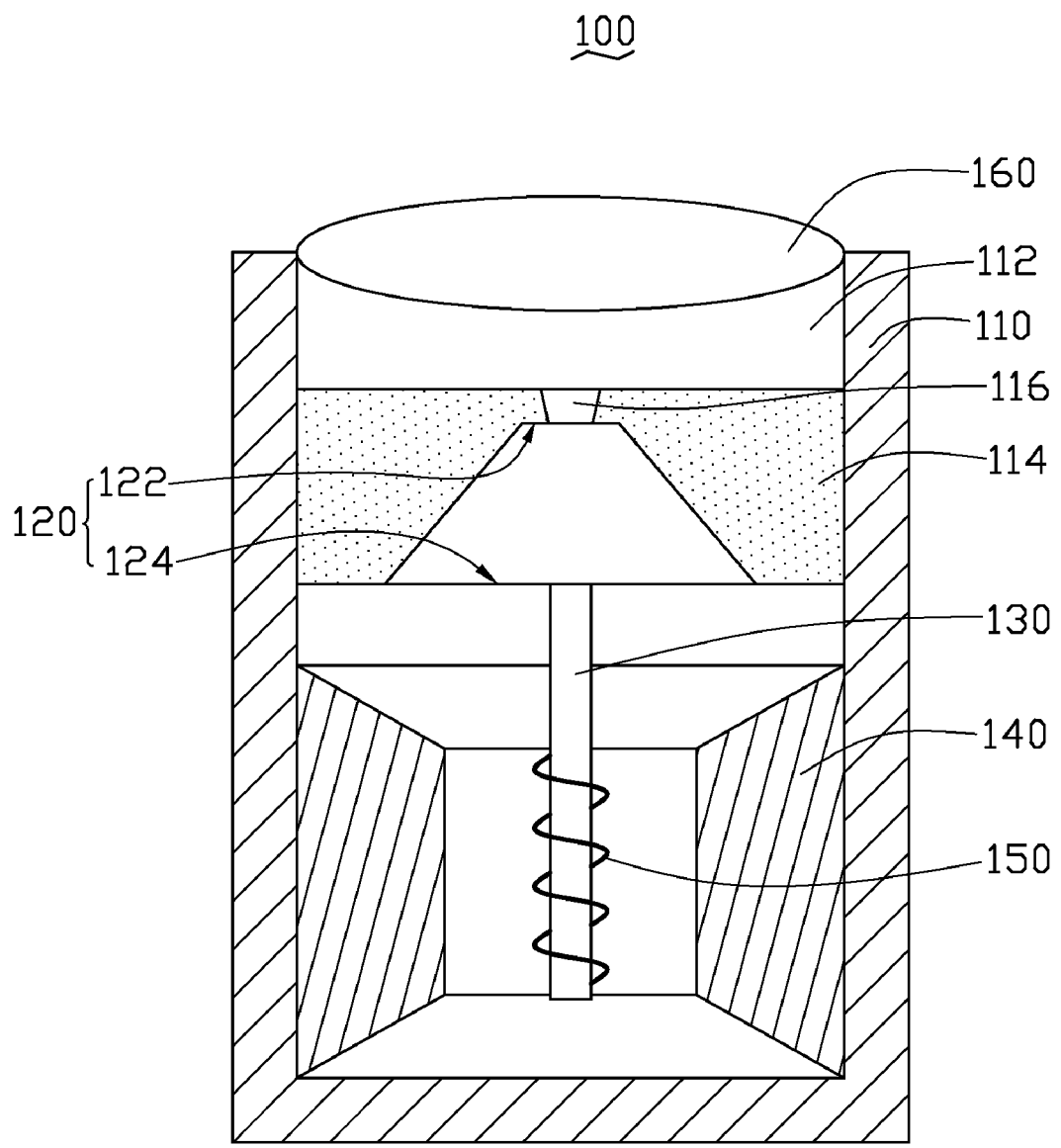
FIG. 1 is a cross-sectional view of one embodiment of a solar energy converting device.

Referring to FIG. 1, one embodiment of a solar energy converting device 100 includes a frame 110, a thermal expansion member 120, a connecting rod 130, a plurality of magnetic members 140, a inductor 150 and a condenser 160. The solar energy converting device 100 is configured for receiving solar energy and transforming the solar energy into working energy for a system.

The frame 110 defines an opening 112. A container 114 is positioned on an inner surface of the frame 110 and adjacent to the opening 112. An aperture 116 is defined in a central portion of the container 114. The container 114 may be a thermally sealed void space and filled with an inert gas. In one embodiment, the inert gas may be helium gas.

The thermal expansion member 120 is positioned in the container 114, and partially surrounded by the container 114. In one embodiment, the thermal expansion member 120 may be frustoconical in shape, and has a top portion 122 and a bottom portion 124 wider in width than the top portion 122. The top portion 122 is positioned in the container 114 and adjacent to the aperture 116. The bottom portion 124 is exposed to the outside of the container 114. The thermal expansion member 120 is made of a material having a high thermal expansion coefficient, such as, aluminum, or aluminum alloy.

The connecting rod 130 is coiled around by the inductor 150. An end of the connecting rod 130 is connected to the bottom portion 124.

The magnetic members 140 are positioned on an inner surface of the frame 110 around the inductor 150 and configured to generate a magnetic field. In one embodiment, the magnetic members 140 may be permanent magnets, such as samarium cobalt (SmCo) magnets or neodymium iron boron (NdFeB) magnets.

The condenser 160 is positioned on the opening 112 and configured to receive and focus sunlight into the container 114 and to the thermal expansion member 120. In one embodiment, the condenser 160 may be a convex lens.

In use, when sunlight is focused by the condenser 160 into the container 114, a portion of the focused sunlight passes through the aperture 116 and is transmitted to the thermal expansion member 120. Energy of the portion of the focused sunlight is directly absorbed by the thermal expansion member 120. The remainder of the focused sunlight is transmitted to the container 114. Energy of the remainder of the focused sunlight is absorbed by the inert gas. The thermal expansion member 120 and the inert gas are heated up and then expand, thereby driving the connecting rod 130 to move downwards. When sunlight does not hit the condenser 160, the thermal expansion member 120 and the inert gas cool down and then shrink, thereby driving the connecting rod 130 to move upwards. As a result, the inductor 150 surrounding the connecting rod 130 can move back and forth in the magnetic filed to generate a voltage.

Figure 2:
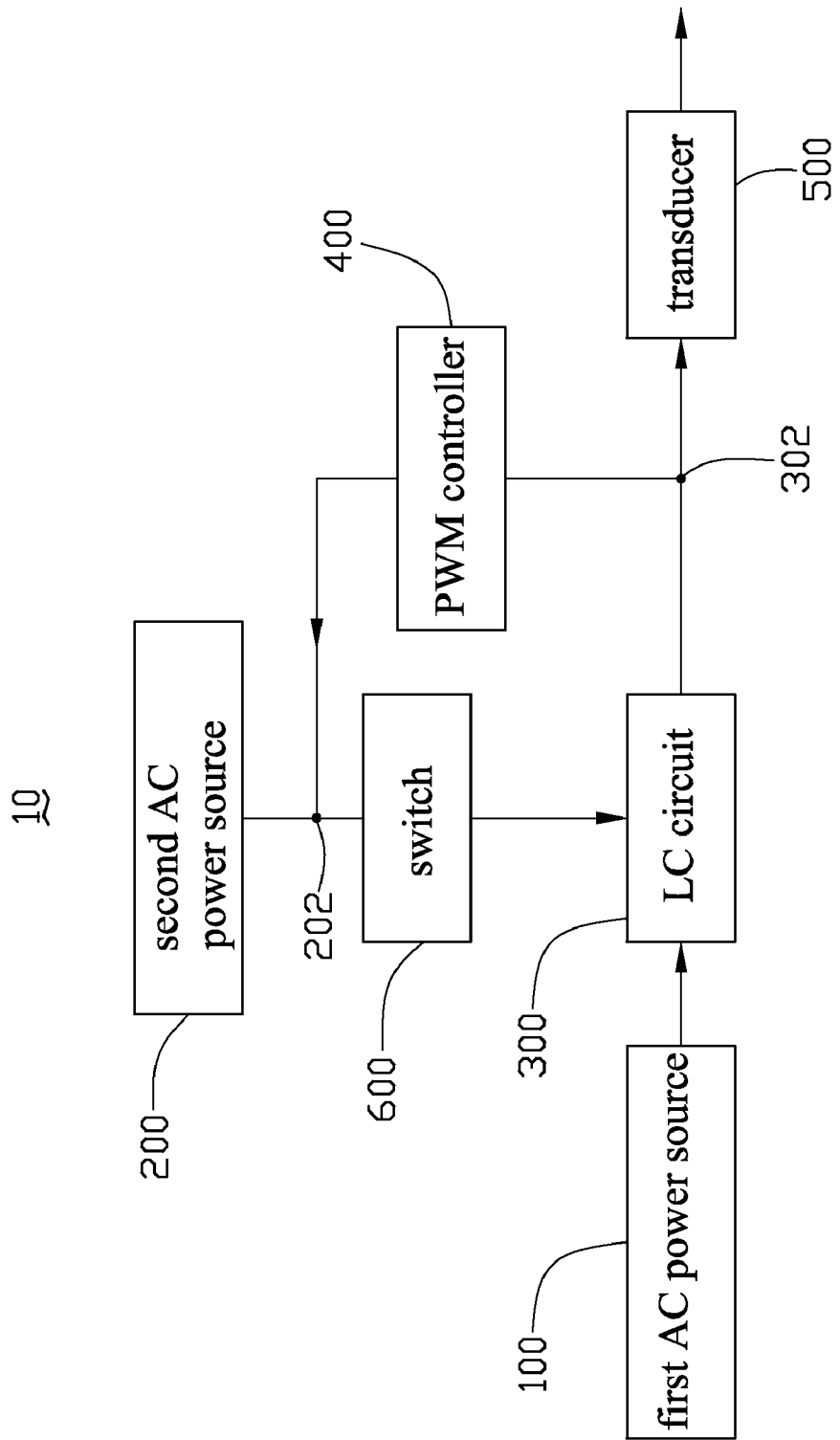
FIG. 2 is a circuit diagram of one embodiment of a power supply system.

Referring to FIG. 2, one embodiment of a power supply system 10 includes a first alternate current (AC) power source 100, a second AC power source 200, an inductor capacitor (LC) circuit 300, a pulse-width modulation (PWM) controller 400, a transducer 500 and a switch 600.

In one example, the first AC power source 100 may be the solar energy converting device 100 of FIG. 1. The second AC power source 200 may be provided by an electricity network or an electrical generator.

The switch 600 is electrically coupled to the second AC power source 200 and configured to turn on or turn off the second AC power source 200.

The LC circuit 300 is electrically coupled to the first AC power source 100 and the switch 600, and configured to match the first AC power source 100 and the second AC power source 200. In one embodiment, the LC circuit 300 includes an inductor and a capacitor electrically connected in parallel with the inductor.

The transducer 500 is electrically coupled to the LC circuit 300 and configured to generate a predetermined AC. In one embodiment, the predetermined AC has a frequency in a range from about 10 KHz to about 1 MHz. In another embodiment, the predetermined AC has a frequency in a range from about 40 KHz to about 400 KHz. The transducer 500 includes a rectifier configured to convert an AC outputted from the LC circuit 300 into a direct current, and an inverter configured to convert the direct current into the predetermined AC.

A first node 202 is formed between the second AC power source 200 and the switch 600. The second node 302 is formed between the LC circuit 300 and the transducer 500. The PWM controller 400 is electrically coupled between the first node 202 and the second node 302, and configured to control the switch 600.

In use, the switch 600 turns the second AC power source 200 off. The first AC power source 100 supplies power. If the first AC power source 100 does not have enough power, the PWM controller 400 detects if the voltage of the second node 302 decreases, and then controls the switch 600 to turn the second AC power source 200 on to further supply power. If the first AC power source 100 accumulates enough power, the PWM controller 400 detects if the voltage of the second node 302 increases, and then controls the switch 600 to turn the second AC power source 200 off.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A solar energy converting device, comprising:
   a frame defining an opening;
   a container positioned on an inner surface of the frame and positioned adjacent to the opening, the container defining a thermally sealed void space, wherein the thermally sealed void space is filled with an inert gas;
   a thermal expansion member positioned in the container, and partially surrounded by the container;
   a connecting rod having an end connected to the thermal expansion member;
   a plurality of magnetic members positioned on the inner surface of the frame and configured for generating a magnetic field; and
   an inductor coiling around the connecting rod and positioned among the magnetic members, wherein the inductor is configured for being driven by the thermal expansion member to move back and forth in the magnetic field so as to generate a voltage.

2. The solar energy converting device of claim 1, further comprising an aperture defined in a central portion of the container, wherein the thermal expansion member is frustoconical in shape and has a top portion and a bottom portion wider in width than the top portion; the top portion is positioned in the container and positioned adjacent to the aperture; the bottom portion is exposed to the outside of the container; the end of the connecting rod is connected to the bottom portion.

3. The solar energy converting device of claim 1, wherein the thermal expansion member is made of a material having a high thermal expansion coefficient.

4. The solar energy converting device of claim 1, wherein the inert gas is helium gas.

5. The solar energy converting device of claim 1, further comprising a condenser positioned on the opening.

6. The solar energy converting device of claim 5, wherein the condenser is a convex lens.

7. The solar energy converting device of claim 1, wherein each of the magnetic members is a permanent magnet.

8. The solar energy converting device of claim 7, wherein the magnetic members are samarium cobalt magnets or neodymium iron boron magnets.

9. A power supply system, comprising a solar energy converting device comprising:
   a frame defining an opening;
   a container positioned on an inner surface of the frame and positioned adjacent to the opening, the container defining a thermally sealed void space, wherein the thermally sealed void space is filled with an inert gas;
   a frustoconical shaped thermal expansion member having a top portion and a bottom portion wider in width than the top portion, wherein the top portion is positioned in the container, and wherein the bottom portion is exposed to the outside of the container;
   a connecting rod having an end connected to the bottom portion;
   a plurality of magnetic members positioned on the inner surface of the frame and configured for generating a magnetic field; and
   an inductor coiling around the connecting rod and positioned among the magnetic members, wherein the inductor is configured for being driven by the thermal expansion member to move back and forth in the magnetic field so as to generate a voltage.

10. The power supply system of claim 9, further comprising:
    an inductor capacitor (LC) circuit electrically coupled to the solar energy converting device;
    a switch electrically coupled to the LC circuit and configured for electrically coupling to an alternate current power source;
    a transducer electrically coupled to the LC circuit, and configured to generate a predetermined alternate current; and
    a pulse-width modulation controller electrically coupled between the switch and a node between the LC circuit and the transducer, and configured to control the switch to turn the alternate current power source on and off in response to voltage of the node.

11. The power supply system of claim 9, wherein an aperture is defined in a central portion of the container; the top portion is adjacent to the aperture.

12. The power supply system of claim 9, wherein the thermal expansion member is made of a material having a high thermal expansion coefficient.

13. The power supply system of claim 9, wherein the inert gas is helium gas.

14. The power supply system of claim 9, wherein the solar energy converting device further comprises a condenser positioned on the opening.

15. The power supply system of claim 14, wherein the condenser is a convex lens.

16. The power supply system of claim 9, wherein each of the magnetic members is a permanent magnet.

17. The power supply system of claim 16, wherein the magnetic members are samarium cobalt magnets or neodymium iron boron magnets.

* * * * *